United States Patent [19]

Omata et al.

[11] Patent Number: 4,777,068

[45] Date of Patent: Oct. 11, 1988

[54] OPTICAL RECORDING MEDIUM

[75] Inventors: Hiroshi Omata; Shigeharu Iijima, both of Kawasaki; Eizo Sasamori, Yokohama; Katsuhiko Takano, Yokohama; Masaaki Matsushima, Yokohama; Kazuoki Honguu, Yokohama; Mitsuharu Sawamura, Yokohama; Kazuhiko Kikuchi, Kawasaki; Takahiko Ishiwatari, Nihonbashi; Hiroyoshi Kishi, Tokyo; Hisaaki Kawade, Yokohama, all of Japan

[73] Assignee: Canon Kabushiki Kaisha, Tokyo, Japan

[21] Appl. No.: 762,447

[22] Filed: Aug. 5, 1985

[30] Foreign Application Priority Data

| | | | |
|---|---|---|---|
| Aug. 10, 1984 | [JP] | Japan | 59-168029 |
| Aug. 10, 1984 | [JP] | Japan | 59-168030 |
| Sep. 28, 1984 | [JP] | Japan | 59-203032 |
| Sep. 28, 1984 | [JP] | Japan | 59-203033 |

[51] Int. Cl.[4] .......... G11B 7/24

[52] U.S. Cl. .......... 428/69; 428/216; 428/336; 428/428; 428/432; 428/472; 428/694; 428/698; 428/900

[58] Field of Search .......... 428/694, 698, 900, 472, 428/469, 701, 702, 216, 69, 326, 428; 360/131, 135; 365/122; 430/945

[56] References Cited

U.S. PATENT DOCUMENTS

| | | | |
|---|---|---|---|
| 4,277,540 | 7/1981 | Aine | 428/433 |
| 4,390,600 | 6/1983 | Ohta et al. | 428/900 |
| 4,539,572 | 9/1985 | Rabbins et al. | 430/945 |
| 4,544,443 | 10/1985 | Ohta et al. | 427/309 |
| 4,554,217 | 11/1985 | Grimm et al. | 428/695 |
| 4,661,420 | 4/1987 | Nakamura et al. | 428/692 |

FOREIGN PATENT DOCUMENTS

| | | |
|---|---|---|
| 2362465 | 4/1978 | France . |
| 2218306 | 11/1973 | Fed. Rep. of Germany . |
| 21901 | 2/1978 | Japan . |
| 19739 | 2/1983 | Japan . |
| 130437 | 8/1983 | Japan . |
| 164030 | 9/1983 | Japan . |
| 179940 | 10/1983 | Japan . |
| 179939 | 10/1983 | Japan . |
| 61107 | 4/1984 | Japan . |
| 157832 | 9/1984 | Japan . |
| 231937 | 11/1985 | Japan . |
| 832590 | 5/1981 | U.S.S.R. . |

OTHER PUBLICATIONS

Materials at Magnetic Recording Study Meeting, published in 1974, pp. 27-37-Pertinent Portions.

Cuomo et al., "Antireflection Coatings for the Enhancement of Magneto-Optic Effects in Amourphous Rare Earth-Transition Metal Alloys", IBM TDB vol. 16, No. 5, Oct. 1973, p. 1442.

*Primary Examiner*—George F. Lesmes
*Assistant Examiner*—William M. Atkinson
*Attorney, Agent, or Firm*—Fitzpatrick, Cella, Harper & Scinto

[57] ABSTRACT

In an optical recording medium having an optical recording layer provided on a substrate, a carbide film of a substance selected from among tungsten, boron, molybdenum, hafnium, niobium, titanium, chromium, vanadium, tantalum and silicon is formed on one or each side of the recording layer.

24 Claims, 5 Drawing Sheets

CHANGE OF COERCIVE FORCE 1.0

0.5

SiC

SiO 0 200 400 600 800 1000

TIME (h)

OPTICAL RECORDING MEDIUM

BACKGROUND AND SUMMARY OF THE INVENTION

This invention relates to an optical recording medium which is capable of accomplishing recording and reproduction by a light beam.

As an optical recording medium and in an optical disc or the recording layer thereof, there are known thin films of rare earth-transition metal alloys, thin films of reductive oxides such as chalcogen compounds utilizing the phase transition from non-crystalloid to crystalloid, heat mode recording mediums, thermoplastic recording mediums, etc. For example, as opto-magnetic recording mediums formed of thin films of rare earth-transition metal alloys, there are known polycrystal thin films such as MnBi, MnCuBi and the like, amorphous thin films such as GdCo, GdFe, TbFe, DyFe, GdTbFe, TbDyFe and the like, and single crystal thin films such as GdIG and the like.

Among these thin films, the amorphous thin films have recently been considered to be excellent as an opto-magnetic recording medium by taking into account the film formability when a thin film of large area is made at a temperature in the vicinity of room temperature, the writing efficiency for writing signals with small light-heat energy and the reading-out efficiency for reading out the written signals at a good S/N ratio. Among them, GdTbFe which has a great Kerr rotation angle and has a curie point of about 150° C. is suitable as an opto-magnetic recording medium. Further, the inventors have studied with a view to improve the Kerr rotation angle and as a result, have found that GdTbFeCo is an opto-magnetic recording medium having a sufficiently great Kerr rotation angle and enabling reading-out at a good S/N ratio to be accomplished.

Generally, however, amorphous magnetic materials such as GdTbFe, etc. used in magnetic recording mediums including opto-magnetic recording mediums have a drawback that they are poor in corrosion resistance. That is, if these materials contact the atmosphere or steam, their magnetic characteristic is reduced and finally, they become completely oxidized and transparent. This problem is common to the opto-magnetic recording mediums and the aforementioned optical recording mediums.

In order to eliminate such a drawback, it has heretofore been proposed to provide a protective cover of transparent substance, for example, a protective layer of $SiO_2$ or SiO, on a recording layer, or to adopt an air sandwich structure in which the recording layer is enveloped by inactivated gas or a cemented structure in which a substrate is further provided on the protective layer with an adhesive agent interposed therebetween, but practically sufficient corrosion resistance has not been obtained.

It is an object of the present invention to provide an optical recording medium having its corrosion resistance improved without its characteristic as a recording medium being marred.

The above object of the present invention is achieved by forming, in an optical recording medium having an optical recording layer provided on a substrate, on one or each side of said optical recording layer, a carbide film of a substance selected from among tungsten, boron, molybdenum, hafnium, niobium, titanium, chromium, vanadium, tantalum and silicon.

The carbide film as described above is formed by the evaporation method or the sputtering method. Particularly, the high frequency (RF) sputtering is suitable for the formation of hafnium carbide film, vanadium carbide film and tantalum carbide film, and the electron beam evaporation or the RF sputtering is suitable for the formation of tungsten carbide film, boron carbide film, molybdenum carbide film and niobium carbide film. Further, the reactive evaporation or the reactive RF sputtering is suitable for the formation of titanium carbide film and chronium carbide film, and the RF sputtering is suitable for the formation of silicon carbide film.

In the present invention, where a carbide film is to be formed subsequently to the optical recording layer, it is desirable to form the recording layer by a method such as sputtering, and thereafter continuously form a carbide film without breaking the vacuum. Also, where a carbide film is to be formed on a substrate and an optical recording layer is to be formed thereon and further a carbide film is to be formed thereon, it is preferable to form the films continuously in the same tank without breaking the vacuum.

It is another object of the present invention to provide an optical recording medium which is great in the S/N ratio of read-out signal moreover has a sufficient corrosion resistance and has a structure in which an optical interference film, a reflecting layer, etc. are laminated in succession from the recording layer side to obtain, especially, the enhancement effect of the magneto-optical effect.

The above another object of the present invention is achieved by an optical recording medium provided with at least an optical recording layer and a reflecting layer on a substrate, characterized in that an optical interference film consisting of silicon carbide is provided between said optical recording layer and said reflecting layer.

It is a still another object of the present invention to provide an optical recording medium characterized in that at least an optical recording layer and a film of carbide are provided on a substrate having an SiO film as an under-laid layer provided thereon in contact therewith.

As the film of carbide, use may be made of any carbide having a transmitting property required with respect to the light used and chemically stable and excellent in moisture resistance, and preferred carbides are SiC and $B_4C$. The film thickness of carbide may preferably in the range of 200 Å to 2000 Å. If the film thickness is less than 200 Å, the film will be insufficient in corrosion resistance, and if the film thickness exceeds 2000 Å, there will be the undesirable possibility of the recording sensitivity being reduced or cracks or the like being created in the film.

The optical recording medium of the present invention may assume any of the cemented structure and the air sandwich structure.

The SiO film provided as an under-laid layer is provided to improve the unitability of the film provided thereon with the substrate, and the thickness of that film may preferably in the range of 500 Å to 2000 Å.

DESCRIPTION OF THE PREFERRED EMBODIMENTS

The present invention will hereinafter be described in greater detail with respect to some embodiments thereof.

Embodiment 1

In an RF sputtering apparatus, a white sheet glass having a size of 1 inch×1 inch was used as a substrate, and small pieces of gadolinium (Gd) and terbium (Tb) each having a size of 5 mm×5 mmφ uniformly arranged on an iron (Fe) piece of 100 mm were used as a composite target and sputtering was effected, whereby an optical recording layer of a thickness of 1000 Å comprising a GdTbFe three-element amorphous magnetic film was formed on the white sheet glass substrate. Subsequently, in an ordinary vacuum evaporation apparatus, the air was exhausted to the order of $2\times10^{-4}$ Pa, whereafter tungsten carbide (WC) was vaporized by an electron beam vaporization source, and a tungsten carbide film of a thickness of 3000 Å was evaporated on said recording layer.

Embodiment 2

In an RF sputtering apparatus, a white sheet glass having a size of 1 inch×1 inch was used as a substrate and the same composite target of Fe, Gd and Tb as that in Embodiment 1 was used, whereby a recording layer of a thickness of 1000 Å was formed on the substrate by sputtering. Subsequently, the interior of a vacuum tank was evacuated to the order of $2\times10^{-4}$ Pa, and argon gas (Ar) was introduced thereinto up to $4\times10^{-1}$ Pa, and tungsten carbide was used as a second target and a tungsten carbide film of a thickness of 2000 Å was formed on said recording layer by sputtering.

Embodiment 3

In an RF sputtering apparatus, the interior of a vacuum tank was evacuated to the order of $4\times10^{-4}$ Pa, whereafter argon gas (Ar) was introduced thereinto up to the order of $4\times10^{-1}$ Pa. Then, polymethyl methacrylate (PMMA) was used as a substrate, and tungsten carbide was used as a first target, whereby a tungsten carbide film of a thickness of 200 Å was formed on said substrate by sputtering. Subsequently, with the same composite target of Fe, Gd and Tb as that in Embodiment 1 being used as a second target, a recording layer of a thickness of 1000 Å was formed thereon by sputtering. Further, the interior of the tank was evacuated to the order of $4\times10^{-4}$ Pa, whereafter Ar gas was introduced thereinto up to $4\times10^{-1}$ Pa, and by the use of the first target, a tungsten carbide film of a thickness of 2000 Å was formed on said recording layer.

Figure 1:
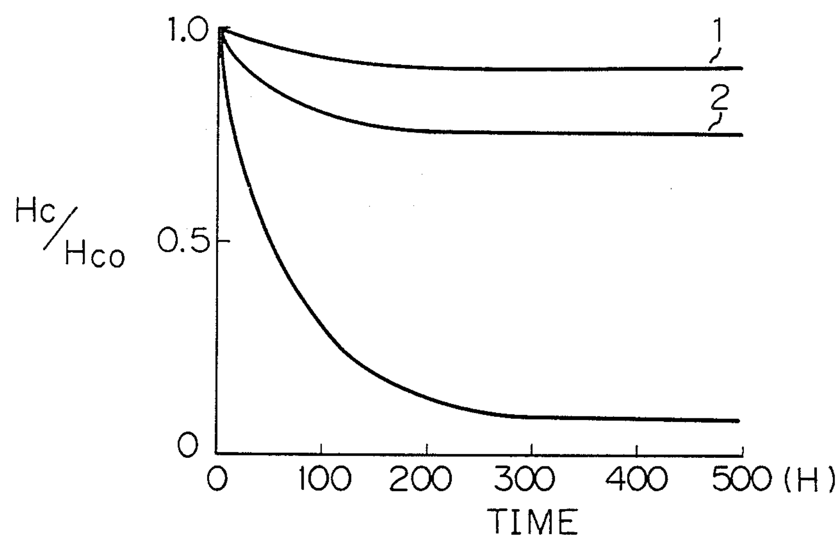
FIGS. 1 and 2 are graphs showing the results of the corrosion resistance tests of optical recording mediums as shown in FIGS. 3 and 4.
Figure 2:
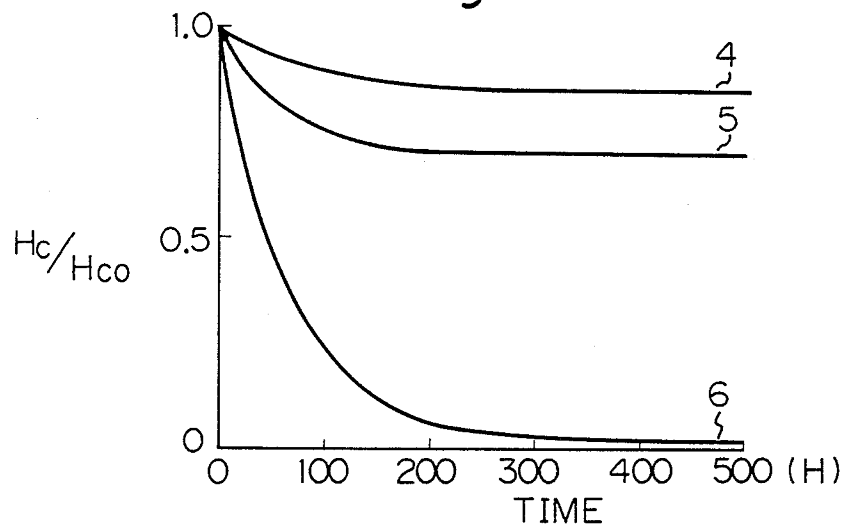

The results of the corrosion resistance tests carried out with the optical recording mediums made in accordance with Embodiments 1–3 being placed in a constant-temperature constant-humidity tank of 70° C. and 85% RH are shown in FIGS. 1 and 2. In FIGS. 1 and 2, the abscissa represents the test time (unit is hour (H)) and the ordinate represents the variation in coercive force Hc at the ratio to the initial value HcO of the coercive force. These graphs show that as the reduction in coercive force is sharper, corrosion progresses more rapidly.

In FIG. 1, reference numeral 1 shows the result of the test of Embodiment 1 and reference numerals 2 and 3 show the results of comparative examples. Comparative example 3 is one in which an optical recording layer of a thickness of 1000 Å comprising a GdTbFe three-element amorphous magnetic film similar to that in Embodiment 1 is formed on a glass substrate and no protective film is provided, and comparative example 2 in one in which a film of SiO having a thickness of 3000 Å is deposited as a protective film on the recording layer of comparative example 3. It will be seen that the optical recording medium having tungsten carbide thus provided as the protective layer is more excellent in corrosion resistance than theoptical recording mediums of comparative examples 2 and 3. When a similar test was carried out for the medium of Embodiment 2, there was obtained substantially the same result as that of Embodiment 1.

In FIG. 2, reference numeral 4 shows the result of the test of Embodiment 3 and reference numerals 5 and 6 show the results of comparative examples. Comparative example 6 is one in which an optical recording layer of a thickness of 1000 Å comprising a GdTbFe three-element amorphous magnetic film similar to that in Embodiment 3 is formed on a PMMA substrate and no protective film is provided, and comparative example 5 is one in which an SiO film of a thickness of 200 Å is provided on a PMMA substrate and a recording layer of a thickness of 1000 Å consisting of Gd, Tb and Fe is formed thereon and a protective film of a thickness of 3000 Å consisting of SiO is deposited on the recording layer. Again from FIG. 2, it will be seen that the protective film of tungsten carbide is effective in improving the corrosion resistance.

Embodiments 4–12

Optical recording mediums provided with protective films consisting of niobium carbide (NbC), molybdenum carbide ($Mo_2C$) and boron carbide ($B_4C$), respectively, instead of tungsten carbide of Embodiments 1–3 were made by a similar method. The constructions of these optical recording mediums are shown in Table 1. As the optical recording layer, use was made of a GdTbFe three-element amorphous magnetic film of a thickness of 1000 Å.

TABLE 1

| | Construction | (Carbide film forming method) |
|---|---|---|
| Embodiment 4: | glass substrate/recording layer/molybdenum carbide film of 3000Å | (Electron beam evaporation) |
| Embodiment 5: | glass substrate/recording layer/molybdenum carbide film of 2000Å | (RF sputtering) |
| Embodiment 6: | PMMA substrate/molybdenum carbide film of 200Å/ recording layer/molybdenum carbide film of 2000Å | (RF sputtering) |
| Embodiment 7: | glass substrate/recording layer/niobium carbide film of 3000Å | (Electron beam evaporation) |
| Embodiment 8: | glass substrate/recording layer/niobium carbide film of 2000Å | (RF sputtering) |
| Embodiment 9: | PMMA substrate/niobium carbide film of 200Å/ recording layer/niobium carbide film of 2000Å | (RF sputtering) |
| Embodiment 10: | glass substrate/recording layer/boron carbide film of 3000Å | (Electron beam evaporation) |
| Embodiment 11: | glass substrate/recording layer/boron carbide film of 2000Å | (RF sputtering) |
| Embodiment 12: | PMMA substrate/boron carbide film of 200Å/ recording layer/boron carbide film of 2000Å | (RF sputtering) |

Corrosion resistance tests were carried out with the optical recording mediums made in accordance with Embodiments 4–12 being placed in a constant-temperature constant-humidity tank of 70° C. and 85% RH. The results were entirely similar to those obtained in the cases of FIGS. 1 and 2 where tungsten carbide was used as the protective film. That is, again in a case where molybdenum carbide, boron carbide or niobium carbidc is used as the protective film, the corrosion resistance of the optical recording medium can be remarkably improved.

Embodiment 13

In an RF sputtering apparatus, a white sheet glass having a size of 1 inch×1 inch was used as a substrate, and small pieces of gadolinium (Gd) and terbium (Tb) each having a size of 5 mm×5 mm uniformly arranged on an iron (Fe) piece of 100 mm were used as a composite target and sputtering was effected, whereby an optical recording layer of a thickness of 1000 Å comprising a GdTbFe three-element amorphous magnetic film was formed on said substrate. Subsequently, the interior of a vacuum tank was evacuated to the order of $4\times10^{-4}$ Pa, whereafter argon (Ar) gas was introduced thereinto up to $4\times10^{-1}$ Pa, and tantalum carbide was used as a second target in the same tank and a tantalum carbide film of a thickness of 2000 Å was formed on said recording layer by sputtering.

Embodiment 14

In an RF sputtering apparatus, the interior of a vacuum tank was evacuated to the order of $4\times10^{-4}$ Pa, whereafter argon (Ar) gas was introduced thereinto up to the order of $4\times10^{-1}$ Pa. Then, polymethyl methacrylate (PMMA) was used as a substrate and tantalum carbide was used as a first target, whereby a tantalum carbide film of a thickness of 200 Å was formed on the substrate by sputtering. Subsequently, with the same composite target of Fe, Gd and Tb as that in Embodiment 13 being used as a second target, a recording layer of a thickness of 1000 Å was formed thereon by sputtering. Further, the interior of the tank was evacuated to the order of $4\times10^{-4}$ Pa, whereafter Ar gas was introduced thereinto up to $4\times10^{-1}$ Pa, and by the use of the first target, a tantalum carbide film of a thickness of 2000 Å was formed on said recording layer.

Embodiments 15–18

Optical recording mediums provided with protective films consisting of vanadium carbide and hafnium carbide, respectively, instead of tantalum carbide of Embodiments 13 and 14, were made by a similar method. Their constructions are shown in Table 2. As the optical recording layer, use was made a GdTbFe three-element amorphous magnetic film of a thickness of 1000Å.

TABLE 2

| | Construction |
|---|---|
| Embodiment 15: | glass substrate/recording layer/vanadium carbide film of 2000Å |
| Embodiment 16: | PMMA substrate/vanadium carbide film of 200Å/recording layer/ vanadium carbide film of 2000Å |
| Embodiment 17: | glass substrate/recording layer/hafnium carbide film of 2000Å |
| Embodiment 18: | PMMA substrate/hafnium carbide film of 200Å/recording layer/ hafnium carbide film of 2000Å |

Corrosion resistance tests were carried out with the optical recording mediums made in accordance with Embodiments 13–18 being placed in a constant-temperature constant-humidity tank of 70° C. and 85% RH. With regard to Embodiments 13 and 15, a result entirely similar to that shown in FIG. 1 was obtained. With regard to Embodiments 14, 16 and 18, a result entirely similar to that shown in FIG. 2 was obtained. That is, again in a case where tantalum carbide, vanadium carbide or hafnium carbide is used as the protective film, an optical recording medium excellent in corrosion resistance is obtained as in a case where tungsten carbide is used.

Embodiment 19

In an RF sputtering apparatus, a white sheet glass having a size of 1 inch×1 inch was used as a substrate, and small pieces of gadolinium (Gd) and terbium (Tb) each having a size of 5 mm×5 mm uniformly arranged on an iron (Fe) piece of 100 mm were used as a composite target and sputtering was effected, whereby an optical recording layer of a thickness of 1000 Å comprising a GeTbFe three-element amorphous magnetic film was formed on said substrate. Subsequently, it was placed into a vacuum evaporation apparatus provided with a high frequency discharging post and the interior of the apparatus was evacuated up to the order of $4\times10^{-4}$ Pa, whereafter methane ($CH_4$) gas was introduced thereinto up to the order of $2\times10^{-2}$ Pa and titanium carbide was vaporized by an electron beam while discharge was caused with a high frequency power applied, whereby a titanium carbide film of a thickness of 3000 Å was deposited by evaporation on said recording layer.

Embodiment 20

In an RF sputtering apparatus, a white sheet glass having a size of 1 inch×1 inch was used as a substrate, and by the use of the same composite target of Fe, Gd and Tb as that in Embodiment 19, a recording layer of a thickness of 1000 Å was formed on the substrate by sputtering. Subsequently, the interior of a vacuum tank was evacuated up to the order of $4\times10^{-4}$ Pa, whereafter argon (Ar) gas and methane ($CH_4$) gas were introduced thereinto at a ratio of 1:2 up to the order of 1 Pa, and titanium carbide was used as a second target and a titanium carbide film of a thickness of 2000 Å was formed on said recording layer by sputtering.

Embodiment 21

In an RF sputtering apparatus, the interior of a vacuum tank was evacuated up to the order of $4\times10^{-4}$ Pa, whereafter argon (Ar) gas and methane ($CH_4$) gas were introduced thereinto at a ratio of 1:2 up to the order of 1 Pa. Then, polymethyl methacrylate (PMMA) was used as a substrate and titanium carbide was used as a first target, whereby a titanium carbide film of a thickness of 200 Å was formed on the substrate by sputtering. Subsequently, with the same composite target of Fe, Gd and Tb as that in Embodiment 19 being used as a second target, a recording layer of a thickness of 1000 Å was formed thereon by sputtering. Further, the interior of the tank was evacuated up to the order of $4\times10^{-4}$ Pa, whereafter Ar gas and $CH_4$ gas were introduced thereinto at a ratio of 1:2 up to 1 Pa, and by the use of the first target, a titanium carbide film of a thickness of 2000 Å was formed on said recording layer.

Embodiments 22–24

Optical recording mediums provided with a protective film consisting of chromium carbide instead of titanium carbide of Embodiments 19–21 were made by a similar method. Their constructions are shown in Table 3. As the optical recording layer, use was made of a GdTbFe three-element amorphous magnetic film of a thickness of 1000 Å.

TABLE 3

| | Construction | (Carbide film forming method) |
|---|---|---|
| Embodiment 22: | Glass substrate/recording layer/ chromium carbide film of 3000Å | (Electron beam evaporation) |
| Embodiment 23: | Glass substrate/recording layer/ chromium carbide film of 2000Å | (RF sputtering) |
| Embodiment 24: | PMMA substrate/chromium carbide film of 200Å/recording layer/ chromium carbide film of 2000Å | (RF sputtering) |

Corrosion resistance tests were carried out with the optical recording mediums made in accordance with Embodiments 19–24 being placed in a constant-temperature constant-humidity tank of 70° C. and 85% RH. With regard to Embodiments 19, 20, 22 and 23, a result entirely similar to that shown in FIG. 1 was obtained. With regard to Embodiments 21 and 24, a result entirely similar to that shown in FIG. 2 was obtained. That is, again in a case where titanium carbide or chromium carbide is used as the protective film, an optical recording medium excellent in corrosion resistance is obtained as in the case where tungsten carbide is used.

Embodiment 25

In an RF sputtering apparatus, a white sheet glass having a size of 1 inch×1 inch was used as a substrate, and small pieces of gadolinium (Gd) and terbium (Tb) each having a size of 5 mm×5 mm uniformly arranged on an iron (Fe) piece of 100 mmϕ were used as a composite target and sputtering was effected, whereby an optical recording layer of a thickness of 1000 Å comprising a GdTbFe three-element amorphous magnetic film was formed on said substrate. Subsequently, the interior of a vacuum tank was evacuated up to the order of $4\times10^{-4}$ Pa, whereafter argon (Ar) gas was introuduced thereinto up to $4\times10^{-1}$ Pa, and silicon carbide was used as a second target in the same tank, whereby a silicon carbide film of a thickness of 2000 Å was formed on said recording layer by sputtering.

Embodiment 26

In an RF sputtering apparatus, the interior of a vacuum tank was evacuated up to the order of $4\times10^{-4}$ Pa, whereafter argon (Ar) gas was introduced thereinto up to the order of $4\times10^{-1}$ Pa. Then, polymethyl methacrylate (PMMA) was used as a substrate and silicon carbide was used as a first target, whereby a silicon carbide film of a thickness of 200Å was formed on the substrate by sputtering. Subsequently, with the same composite target of Fe, Gd and Tb as that in Embodiment 25 being used as a second target, a recording layer of a thickness of 1000 Å was formed by sputtering. Further, the interior of the tank was evacuated up to the order of $4\times10^{-4}$ Pa, whereafter Ar gas was introduced thereinto up to $4\times10^{-1}$ Pa, and by the use of the first target, a silicon carbide film of a thickness of 2000 Å was formed on said recording layer.

Corrosion resistance tests were carried out with the optical recording mediums made in accordance with Embodiments 25 and 26 being placed in a constant-temperature constant-humidity tank of 70° C. and 85% RH. The result was entirely similar to the cases of FIGS. 1 and 2 where tungsten carbide was used as the protective film.

Figure 3:
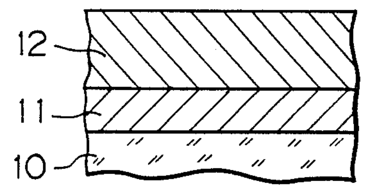
FIGS. 3 and 4 are cross-sectional views schematically showing these optical recording mediums.
Figure 4:
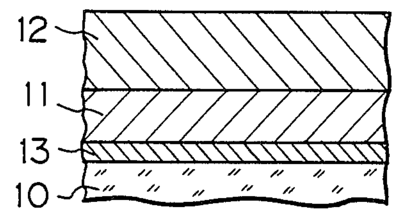

The above-described embodiments are schematically shown in FIGS. 3 and 4. A recording layer 11 is formed on a substrate 10 and further, a protective film 12 which is a carbide film is formed thereon, or a protective film 13 which is a carbide film is formed on a substrate 10, a recording layer 11 is provided thereon and further, a protective film 12 which is a carbide film is formed thereon.

Figure 5:
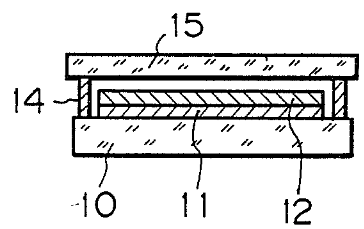
FIGS. 5 to 7 show modifications.
Figure 6:
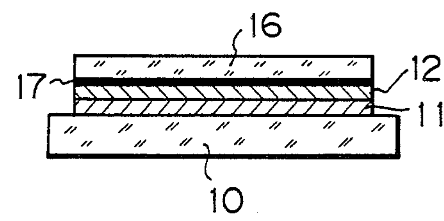

The present invention is not restricted to the above-described embodiments, but various changes thereof are possible. For example, the optical recording layer is not limited to an opto-magnetic recording film, but may be formed of any optical recording material as described in connection with the prior art. Also, the optical recording medium constructed in accordance with the present invention may be made into an air sandwich structure as shown in FIG. 5 wherein the recording layer 11 is enveloped by inactivated gas in a space formed between two substrates 10 and 15 with a spacer 14 interposed therebetween, or a structure as shown in FIG. 6 wherein a glass plate 16 or the like is cemented by means of an adhesive agent 17, thereby further improving the corrosion resistance.

Figure 7:
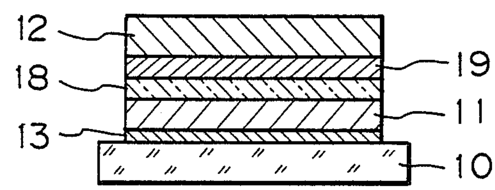

Further, according to the present invention, in the case of an opto-magnetic recording medium, a construction as shown in FIG. 7 may be adopted. On a transparent substrate 10, in succession from below, there are provided a protective layer 13 of carbide, a recording layer 11 of a thickness of 100 Å-300Å, a dielectric layer 18 formed of SiO, $SiO_2$ or the like, a reflecting layer 19 formed of Al, Cu or the like, and a protective layer 12 of carbide.

As regards the thicknesses of the protective films of carbide, it is necessary that the thickness of the protective film 13 adjacent to the substrate 10 be 1500 Å or less with the absorption of light by the protective film 13 taken into account because light enters from the substrate 10 side, and accordingly, a thickness of 100 Å-1500 Å is preferable. The protective film 13 adjacent to the substrate 10 may be made more or less thinner than the protective film 12 opposite from the substrate 10 because the substrate 10 has a protective effect.

The thickness of the protective film 12 opposite from the substrate 10 may be of the order of 1000 Å-5000 Å, and preferably 2000 Å-3000 Å.

Figure 8:
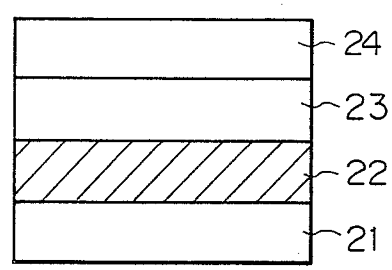
FIGS. 8 to 10 are cross-sectional views schematically showing optical recording mediums each of which has a structure in which an optical interference film, a reflecting layer, etc. are laminated.

Turning to FIG. 8, reference numeral 21 designates a substrate, reference numeral 22 denotes a recording layer, reference numeral 23 designates an optical interference film serving also as a protective anti-corrosion layer, and reference numeral 24 denotes a reflecting layer.

The substrate 21 is formed of glass, or plastic such as polymethyl methacrylate resin (PMMA) or polycarbonate resin (PC) or a metal such as aluminum and may be preformed with a pregroove. The recording layer 22 of a substance such as GdTbFe is formed on the substrate 21 by a method such as sputtering, whereafter silicon carbide (hereinafter referred to as SiC) is formed as the optical interference film 23 serving also as a protective anti-corrosion layer by a method such as sputtering or vacuum evaporation. Further, a metal layer such as Cu, Al, Ag or Au is formed as the reflecting layer 24 by a method such as vacuum evaporation or sputtering.

The desired object can be achieved if the optical interference film is provided between at least the recording layer and the reflecting layer, but two or more layers serving also as an under-lain layer and a protective layer, for example, may be provided. Particularly, where the mangetic material is oxidized or absorbs moisture due to the moisture permeation from the substrate material such as PMMA or polycarbonate, it is advisable to provide an optical interference film serving also as a protective anti-corrosion layer also between the substrate and the optical recording layer.

The film thickness of the optical interference film is set to such a film thickness that the deterioration of the C/N ratio is small and the characteristic of the recording layer is prevented from being deteriorated by impurities such as oxygen and moisture contained in the air and the other layers and the recording layer has a sufficient Kerr rotation angle increasing effect to enhance the reproduction C/N ratio. The film thickness of the optical interference film is substantially determined by the characteristic of the recording-reproducing apparatus and is usually set to the range 5 Å-5000 Å. The film thickness of the optical interference film provided between the recording layer and the reflecting layer may preferably be in the range of 20 Å-1500 Å. Where an optical interference film is provided also between the substrate and the recording layer, it is only required to prevent the characteristic of the recording layer from being deteriorated by the influence of impurities such as moisture and oxygen which may enter the recording layer through the substrate, and the film thickness of this optical interference film may preferably be 5 Å-2000 Å, and particularly preferably be 100 Å-1500 Å.

The optical recording medium may be provided with other auxiliary layer such as a protective layer, an adiabatic layer or an anti-reflection layer as required. Also, a protective substrate may be provided on the side opposite from the substrate, and so-called cemented structure or the air sandwich structure in which inactivated gas is enveloped can be adopted.

Embodiment 27

Figure 9:
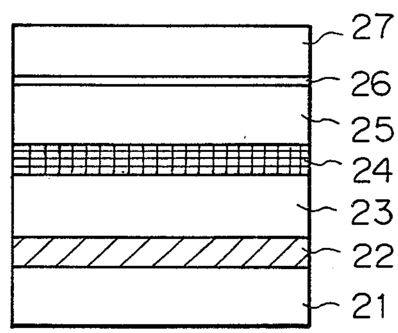

An opto-magnetic recording medium of the structure as shown in FIG. 9 was manufactured in the following manner.

In the high-frequency sputtering method, a white sheet glass of 1 inch×3 inches was used as a substrate 21, and square pieces of GdTb alloy (50:50 atom %) of 1 cm×1 cm uniformly arranged on FeCo alloy (Fe:Co=70:30 atom %) of 5 inches φ were used as a target, and sputtering was carried out in argon gas of 0.5 Pa, whereby GdTbFeCo of about 200 Å which was a recording layer 22 was formed. Thereon, with an SiC compound as a target, SiC of about 200 Å was formed as an optical interference film 23 by sputtering in argon gas of 0.3 Pa. Thereon, Cu of 500 Å was formed as a reflecting layer 24 by the vacuum evaporation method. Thereon, SiC of about 2000 Å was formed as an optical interference film 25 serving also as a protective layer by sputtering under the same conditions as said optical interference film. Further, it was cemented to a protective glass substrate 27 by the use of an epoxy adhesive agent 26. It was confirmed by X-ray diffraction measurement that GdTbFeCo which was the recording layer was amorphous, and the result of composition analysis was $(Gd_{50}Tb_{50})_{23}(Fe_{70}Co_{30})_{77}$. Also, the rotation angle of the plane of polarization of the thus formed opto-magnetic recording medium exhibited 0.9° in the measurement at a wavelength of 830 mm.

It was found by X-ray diffraction measurement that SiC formed in the present embodiment is in amorphous state.

Figure 11:
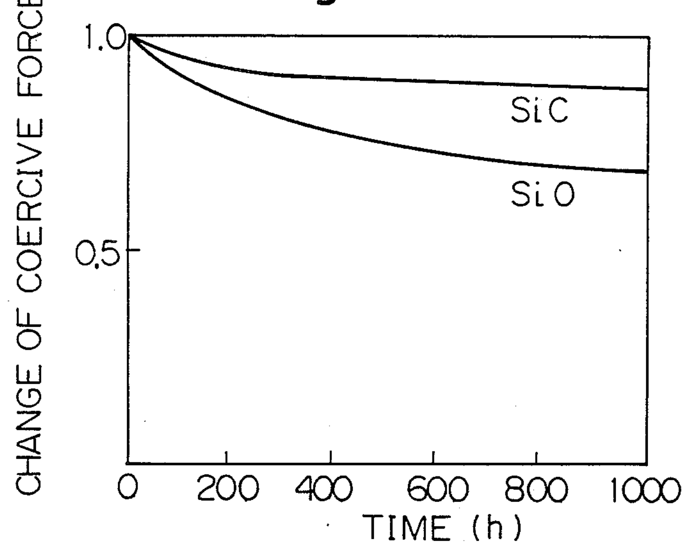
FIGS. 11 and 12 are graphs showing the results of the corrosion resistance tests of optical recording mediums as shown in FIGS. 8 to 10.

A durability test was carried out with this opto-magnetic recording medium placed in a constant-temperature constant-humidity tank of temperature of 85° C. and relative humidity of 85%. For comparison, an opto-magnetic recording medium using SiO for the optical interference film and the protective layer was prepared and a test of this medium was carried out at the same time. The results of these tests are shown in FIG. 11, in which the abscissa represents the test time and the ordinate represents the coercive force found from a Kerr hysteresis curve and standardized by the initial value. The graph of FIG. 11 shows that as the reduction in coercive force was greater, the oxidation and corrosion of the magnetic material of the recording layer by moisture absorption, etc. progressed more rapidly and the effect of the protective film was small. As is apparent from FIG. 11, the opto-magnetic recording medium using SiC for the optical interference film and the protective anti-corrosion layer exhibited more excellent durability.

Also, the Kerr rotation angle of the opto-magnetic recording medium of the present embodiment changed very little even after said durability test was carried out.

Embodiments 28 and 29

Figure 10:
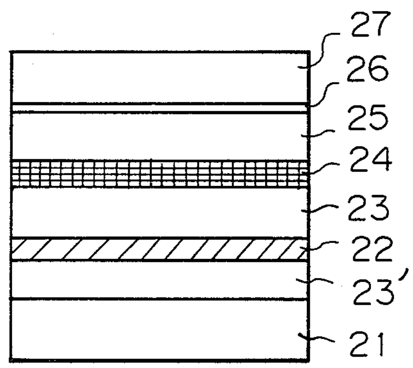

An opto-magnetic recording medium of the structure as shown in FIG. 10 was manufactured in the following manner.

Figure 12:
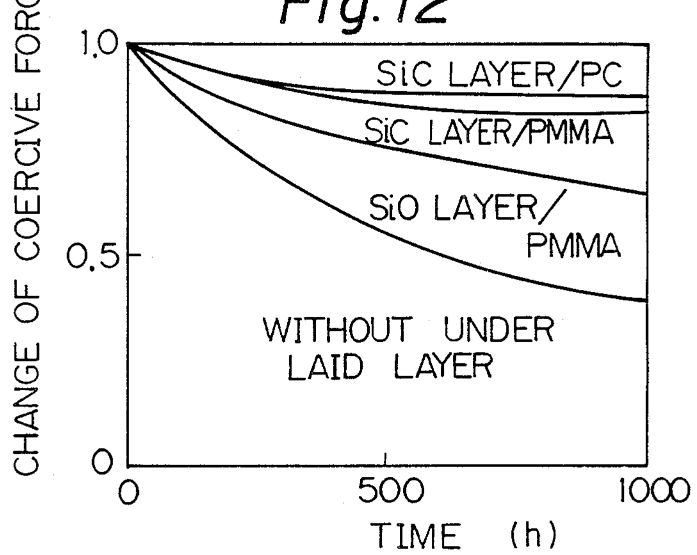

An opto-magnetic recording medium formed by a technique similar to that of Embodiment 27 with the exception that PMMA and PC each of 3 inches×3 inches were used as a substrate 21 and SiC of 150 Å was formed as an optical interference film 23' serving also as an under-laid layer between the substrate and a magnetic film by sputtering was placed into a constant-temperature constant-humidity tank of temperature of 70° C. and relative humidity of 85% and a durability test was carried out. For comparison, an opto-magnetic recording medium made in a manner similar to Embodiment 27 without an under-lain layer being provided on a PMMA substrate and an opto-magnetic recording medium made by the use of a PMMA substrate and with SiO used for all of the under-laid layer, the interference layer and the protective anti-corrosion layer were prepared and durability tests were carried out with respect to these recording mediums at the same time. The results of the tests are shown in FIG. 12. As is apparent from FIG. 12, the recording medium using SiC is more improved in corrosion resistance than the recording medium using SiO. Also, by providing the under-lain layer, the corrosion resistance of the recording medium is more improved than in the case where the under-lain layer is not provided.

Embodiments 30–32

Opto-magnetic recording mediums of a construction similar to the layer construction of Embodiment 27 in the case of a glass substrate and of a construction similar to the layer construction of Embodiments 28–29 in the case of a PMMA and PC substrate with the exception that glass, PMMA and PC were used for the substrate and the SiC compound target in Embodiment 27 was changed to an Si target and an SiC film was formed by effecting high-frequency reactive sputtering in a mixture of Ar and $CH_4$ gases were formed. The opto-magnetic recording medium using glass for the substrate was placed into a constant-temperature constant-humidity tank of temperature of 85° C. and relative humidity of 85%, and the opto-magnetic recording medium using PMMA and PC for the substrate was placed into a constant-temperature constant-humidity tank of temperature of 70° C. and relative humidity of 85%, and durability tests were carried out. The results are shown in Table 4. The change of coercive force is represented with the initial value as 1. As will be apparent from the comparison of the results shown in Table 4 with FIG. 10, even when SiC formed by the reactive sputtering method is used, an opto-magnetic recording medium having the durability equal to that of the SiC film obtained by the use of an SiC compound target is obtained. In the present embodiments, the partial pressure ratio of $CH_4$ to the total sputter gas pressure was 7%, but even if this value is changed to 2–9.5%, a similar effect may be obtained. The gas to be mixed with Ar need not always be $CH_4$, but the use of a gas such as $C_2H_2$ or $C_3H_8$ may result in a similar effect and thus, the kinds of the gases of hydrocarbon do not matter.

TABLE 4

| Embodiment | Substrate | Change of coercive force |
|---|---|---|
| 30 | Glass | 0.92 |
| 31 | PMMA | 0.86 |
| 32 | PC | 0.89 |

Embodiment 33

An opto-magnetic recording medium of a layer construction similar to that of embodiment 27 with the exception that #7059 glass was used as a substrate and in a glow discharge CVD device, evacuation was effected to a back pressure of $10^{-4}$ Pa or less and thereafter discharge was effected in a mixture of $SiH_4$ and $C_3H_8$ gases to thereby form an SiC film was made, and a durability test was carried out under the constant-temperature constant-humidity conditions of temperature of 85° C. and relative humidity of 85%. The reduction in the coercive force after the lapse of 1000 hours was about 12% and the Kerr rotation angle changed very little as compared with the initial value. Thus, also by using a CVD device for the formation of SiC, there can be obtained an opto-magnetic recording medium excellent in durability as in the case of Embodiment 27.

In the present embodiment, the gas flow rate was $SiH_4$ (10 SCCM) $C_3H_8$ (15 SCCM), the total pressure was 16 Pa and the applied power was 10 W, whereas the flow rate and other film forming conditions are not limited thereto. Hydrocarbon gas need not always be limited to $C_3H_8$, but the use of hydrocarbon gas such as $CH_4$, $C_2H_4$ or $C_2H_2$ may also lead to a similar result.

As described above with respect to some embodiments, the use of SiC as the material of the protective anti-corrosion layer and optical interference film in the opto-magnetic recording medium of multi-layer structure can greatly improve the chemical stability and durability of the medium.

Figure 13:
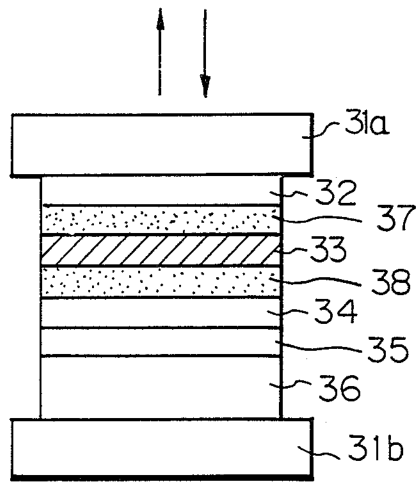
FIG. 13 is a cross-sectional view schematically showing an optical recording medium which has a structure in which an optical recording layer and a film of carbide are provided on a substrate having an SiO film as an under-laid layer provided thereon in contact therewith.

Further turning to FIG. 13, the optical recording medium of FIG. 13 is obtained by forming an under-laid layer 32 on a write-in side substrate 31*a*, providing a carbide film 37, a recording layer 33, a carbide film 38, a spacer layer 34 and a reflecting layer 35 successively on the under-lain layer, and cementing a protective substrate 31*b* thereto with an adhesive layer 36 interposed therebetween.

In the embodiment of FIG. 13, carbide films are provided on the opposite sides of the recording layer and the corrosion resistance is most effective in this case, but alternatively, a carbide film may be provided only on one side of the recording layer, and it is preferable but not requisite to provide the carbide films in contact with the recording layer as in this embodiment, and the objects of the present invention can be achieved even if other auxiliary layer intervenes between the carbide film and the recording layer.

Description will hereinafter be made of a case where the embodiment of FIG. 13 is an opto-magnetic recording medium and a method of making the same.

Plastic or glass is used for the write-in side substrate 31*a*, and the under-laid layer 32 of SiO is formed thereon as by evaporation. The carbide film 37 of SiC or $B_4C$, the magnetic recording layer 33 of GdTbFe or GdTbFeCo, and the carbide film 38 of SiC or $B_4C$ are successively formed as by sputtering, and further, the spacer layer 34 of SiO or the like and the reflecting layer 35 of Cu, Al, Au or the like are formed thereon as by the evaporation method, whereafter the protective substrate 31*b* formed of glass, plastic or a metal such as aluminum is cemented thereto with the adhesive layer 36 interposed therebetween, whereby the opto-magnetic recording medium of the structure as shown in FIG. 13 is obtained.

Embodiment 34

An optical recording medium of the structure shown in FIG. 13 was made as follows.

An SiO film of about 1000 Å as the ground layer 32 was formed on a plastic substrate 31*a* of polyacrylate resin by the evaporation method, and an SiC film of 500 Å was formed as a protective film 37 of carbide by sputtering. A film of GdTbFeCo having a thickness of 200 Å was formed thereon by high-frequency sputtering, and a recording layer 33 comprising a magnetic film was formed. Further, an SiC film of 200 Å was formed as a protective layer 38 by sputtering, whereafter an SiO film of about 700 Å as a spacer layer 34 and an Al film of about 500 Å as a reflecting layer 35 were evaporated, and these were cemented to a protective plastic substrate 31*b* by the use of a silicon adhesive agent as an adhesive layer 36, whereby an opto-magnetic recording medium was obtained.

With respect to the recording medium thus obtained, the Kerr rotation angle $\theta k$ and the coercive force Hc thereof were measured and also 500 hours of moisture resistance test was carried out in a constant-temperature constant-humidity tank of 45° C. and relative humidity 95%.

Figure 14:
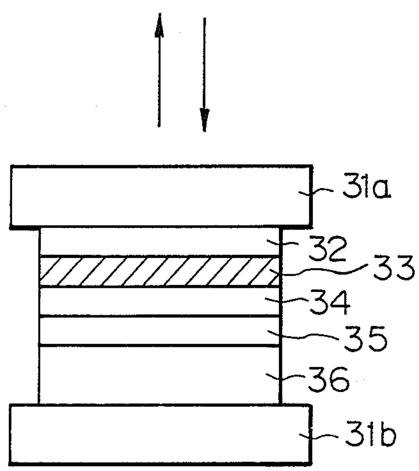
FIG. 14 is a cross-sectional view schematically showing a comparative example.

For the sake of comparison, a test was also carried out with respect to a recording medium having a construction similar to what has been described above, with the exception that the protective layers 37 and 38 are not provided, as shown in FIG. 14.

The result is as shown in Table 5 below, and the optical recording medium of the present invention did not exhibit any deterioration of magnetic characteristic and was improved in durability. The numerical values in Table 5 are shown at the percentage when the initial value is 1.0.

Embodiment 35

An opto-magnetic recording medium similar in film construction to Embodiment 34 with the exception that instead of the SiC film in Embodiment 34, $B_4C$ films were provided as protective layers 37 and 38 by sputtering was made.

Like Embodiment 34, the Kerr rotation angle $\theta k$ and the coercive force Hc were measured and 500 hours of moisture resistance test was carried out in a constant-temperature constant-humidity tank of 45° C. and relative humidity of 95%.

The result is as shown in Table 5 below, and durability could be improved.

TABLE 5

| | Initial characteristic | | After 500 hours of moisture resistance test | |
|---|---|---|---|---|
| | Hc | Θk | Hc | Θk |
| Embodiment 34 | 1.0 | 1.0 | 0.9 | 0.9 |
| Embodiment 35 | 1.0 | 1.0 | 0.9 | 0.9 |
| Comparative example | 1.0 | 1.0 | 0.2 | 0.2 |

According to the optical recording medium of the present invention, even if the recording layer is, for example, a magnetic layer having a thickness of about several hundred Å, a film of carbide containing no oxygen in the film itself and excellent in moisture resistance can be provided on one or each side thereof to thereby remarkably improve the corrosion resistance of the recording medium. That effect is excellent particularly in a case where said film of carbide is provided in contact with the recording layer. Also, by providing an SiO film as the under-laid layer on the substrate, the unitability of the film provided thereon with the substrate can be improved.

The present invention is not restricted to an opto-magnetic recording medium, but is likewise effective with respect also to the improvement of corrosion resistance of other optical recording medium having a readily oxidizable recording layer such as a thin sheet of chalcogen compound.

As described above, the present invention has the effect of remarkably improving the corrosion resistance of an optical recording medium by forming on one or each side of the recording layer thereof a carbide film of a substance selected from among tungsten, boron, hafnium, molybdenum, chromium, titanium, niobium, vanadium, tantalum and silicon.

We claim:

1. An opto-magnetic recording meduim comprising:
   a substrate;
   an opto-magnetic recording layer consisting of a magnetic film provided on said substrate; and
   a protective film formed on one or each side of said recording layer and consisting of a carbide of a substance selected from the group consisting of tungsten, boron, molybdenum, hafnium, niobium, titanium, chromium, vanadium, tantalum and silicon.

2. An opto-magnetic recording medium according to claim 1, wherein said substrate is a white glass sheet.

3. An opto-magnetic recording medium according to claim 1, wherein said substrate is a polymethyl methacrylate (PMMA) sheet.

4. An opto-magnetic recording medium according to claim 1, wherein said magnetic film is a GdTbFe three-element amorphous magnetic film.

5. An opto-magnetic recording medium according to claim 1, wherein said protective film consists of a carbide of a substance selected from among tungsten, boron, molybdenum and niobium and the formation thereof is accomplished by electron beam evaporation.

6. An opto-magnetic recording medium according to claim 1, wherein said protective film consists of a carbide of titanium or chromium and the formation thereof is accomplished by reactive evaporation.

7. An opto-magnetic recording medium according to claim 1, wherein said recording layer is of a thickness of about 1000 Å.

8. An opto-magnetic recording medium according to claim 1, wherein said protective film is provided only on the side opposite from said substrate and the thickness thereof is 2000 Å to 3000 Å.

9. An opto-magnetic recording medium according to claim 1, wherein said protective film is provided on each side of said recording layer, the thickness of the protective film adjacent to said substrate is about 200 Å and the thickness of the protective film opposite from said substrate is 2000 Å to 3000 Å.

10. An opto-magnetic recording medium according to claim 1, wherein another substrate is cemented to the protective film opposite from said substrate with an adhesive agent interposed therebetween.

11. An opto-magnetic recording medium according to claim 1, wherein a space is formed between said substrate and another substrate discrete from said substrate with a spacer interposed therebetween, and said recording layer is enveloped by inactivated gas in said space.

12. An opto-magnetic recording meduim according to claim 1, wherein the formation of said protective film is accomplished by high frequency (RF) sputtering.

13. An opto-magnetic recording medium according to claim 12, wherein said protective film consists of a carbide of titanium or chromium and the formation thereof is accomplished by reactive RF sputtering.

14. An opto-magnetic recording medium according to claim 1, further comprising an SiO film provided on said substrate in contact therewith as an under-laid layer.

15. An opto-magnetic recording medium according to claim 14, wherein said protective film consists of SiC or $B_4C$.

16. An opto-magnetic recording medium according to claim 14, wherein on said substrate, there are provided in succession from the side of said substrate the SiO film, the one protective film, the optical recording layer, the another protective film, a spacer layer, a reflecting layer and another substrate cemented to the reflecting layer with an adhesive agent interposed between the reflecting-layer and the another substrate.

17. An opto-magnetic recording medium according to claim 1, wherein on said substrate, there are provided in succession from the side of said substrate a protective layer formed of said carbide, said recording layer, a dielectric layer, a reflecting layer and a protective layer formed of said carbide.

18. An opto-magnetic recording medium according to claim 17, wherein the thickness of said recording layer is 100 Å to 300 Å.

19. An opto-magnetic recording medium according to claim 17, wherein said dielectric layer consists of SiO or $SiO_2$.

20. An opto-magnetic recording medium according to claim 17, wherein said reflecting layer consists of Al or Cu.

21. An opto-magnetic recording medium according to claim 1, further comprising a reflecting layer on said protective film and wherein said protective film comprises an optical interference film consisting of silicon carbide provided between said optical recording layer and said reflecting layer.

22. An opto-magnetic recording medium according to claim 21, further comprising another optical interference film provided on said reflecting layer and another substrate cemented to the another optical interference film by an adhesive agent.

23. An opto-magnetic recording medium according to claim 22, wherein said another optical interference film consists of silicon carbide and serves also as a protective layer.

24. An opto-magnetic recording medium according to claim 20, further comprising an optical interference film provided between said substrate and said optical recording layer and serving also as an under-laid layer.

* * * * *

UNITED STATES PATENT AND TRADEMARK OFFICE

CERTIFICATE OF CORRECTION

PATENT NO. : 4,777,068

DATED : October 11, 1988

INVENTOR(S) : HIROSHI OMATA, ET AL.

It is certified that error appears in the above-identified patent and that said Letters Patent is hereby corrected as shown below:

On the Title Page,
AT [56] IN REFERENCES CITED

U.S. Patent Documents, "Rabbins et al." should read --Robbins et al.--.

Other Publications, under "Cuomo et al.", "Amourphous" should read --Amorphous--.

COLUMN 2

Line 14, "chronium" should read --chromium--.
Line 29, "signal moreover" should read --signal, and moreover--.
Line 55, "bly in" should read --bly be in--.
Line 68, "preferably in" should read --preferably be in--.

COLUMN 3

Line 35, "5 mmx5 mm$^{\Phi}$" should read --5 mmx5 mm--.

COLUMN 4

Line 30, "in" should read --is--.
Line 36, "theoptical" should read --the optical--.

UNITED STATES PATENT AND TRADEMARK OFFICE

CERTIFICATE OF CORRECTION

PATENT NO. : 4,777,068

DATED : October 11, 1988

INVENTOR(S) : HIROSHI OMATA, ET AL.

It is certified that error appears in the above-identified patent and that said Letters Patent is hereby corrected as shown below:

COLUMN 5

Line 28, "carbidc" should read --carbide--.

COLUMN 8

Line 15, "100 mm$^{\phi}$" should read --100 mm--.
Line 21, "introu-" should read --intro- --.

COLUMN 9

Line 61, "mangetic" should read --magnetic--.

COLUMN 10

Line 54, "$Gd_{50}Tb_{50})_{23}(Fe_{70}Co_{30})_{77}$." should read --$(Gd_{50}Tb_{50})_{23}(Fe_{70}Co_{30})_{77}$.--.
Line 57, "830 mm." should read --830 nm.--.

COLUMN 12

Line 22, "embodiment 27" should read --Embodiment 27--.

COLUMN 15

Line 21, "meduim" should read --medium--.

UNITED STATES PATENT AND TRADEMARK OFFICE
CERTIFICATE OF CORRECTION

PATENT NO. : 4,777,068

DATED : October 11, 1988

INVENTOR(S) : HIROSHI OMATA, ET AL.

It is certified that error appears in the above-identified patent and that said Letters Patent is hereby corrected as shown below:

COLUMN 16

Line 3, "reflecting-layer" should read --reflecting layer--.
Line 35, "claim 20," should read --claim 22,--.

Signed and Sealed this

Thirtieth Day of May, 1989

Attest:

DONALD J. QUIGG

Attesting Officer

Commissioner of Patents and Trademarks